US009625754B2

(12) United States Patent
Noh et al.

(10) Patent No.: US 9,625,754 B2
(45) Date of Patent: Apr. 18, 2017

(54) DISPLAY APPARATUS

(71) Applicant: Samsung Display Co., Ltd., Yongin, Gyeonggi-Do (KR)

(72) Inventors: Cheolyong Noh, Asan-si (KR); Kise Lee, Yongin-si (KR); Seongsik Choi, Seoul (KR)

(73) Assignee: SAMSUNG DISPLAY CO., LTD, Gyeonggi-Do (KR)

( * ) Notice: Subject to any disclaimer, the term of this patent is extended or adjusted under 35 U.S.C. 154(b) by 89 days.

(21) Appl. No.: 14/496,036

(22) Filed: Sep. 25, 2014

(65) Prior Publication Data
US 2015/0219943 A1 Aug. 6, 2015

(30) Foreign Application Priority Data

Feb. 5, 2014 (KR) .................. 10-2014-0013212

(51) Int. Cl.
*G02F 1/1333* (2006.01)

(52) U.S. Cl.
CPC .... *G02F 1/13338* (2013.01); *G02F 1/133308* (2013.01); *G02F 2001/133314* (2013.01); *G02F 2001/133317* (2013.01); *G02F 2202/28* (2013.01)

(58) Field of Classification Search
CPC ... G02F 1/133308; G02F 2001/133314; G02F 2001/133317; G02F 2202/28
USPC ..... 349/58, 60; 362/632–634; 361/681, 714, 361/752, 644, 728–730, 679; 345/905; 313/582–587, 498–512; 348/794, E5.128; 248/309.1, 200
See application file for complete search history.

(56) References Cited

U.S. PATENT DOCUMENTS

| 8,542,481 | B2* | 9/2013 | Lim | H05K 7/00 349/58 |
|---|---|---|---|---|
| 2009/0185100 | A1* | 7/2009 | Matsuhira | G02B 6/005 349/58 |
| 2010/0165234 | A1* | 7/2010 | Park | G02B 6/0088 349/58 |
| 2011/0187965 | A1* | 8/2011 | Ooishi | G09F 13/04 349/62 |
| 2012/0062825 | A1* | 3/2012 | Seo | G02F 1/133308 349/122 |
| 2013/0027857 | A1* | 1/2013 | Jeong | G02F 1/133308 361/679.01 |
| 2013/0321293 | A1* | 12/2013 | Park | G06F 3/041 345/173 |
| 2014/0240639 | A1* | 8/2014 | Jung | G02F 1/133308 349/60 |

(Continued)

FOREIGN PATENT DOCUMENTS

KR 1020110088811 A 8/2011

*Primary Examiner* — Paul Lee
*Assistant Examiner* — Jia Pan
(74) *Attorney, Agent, or Firm* — Cantor Colburn LLP

(57) ABSTRACT

A backlight assembly outputs light. A display panel receives the light and displays an image. A first adhesive member on an edge of the backlight assembly fixes the backlight assembly to the display panel. The backlight assembly may include a light emitting unit, a light guide plate and a reflecting member. The first adhesive member may intervene between the display panel and the reflecting member and may fix the display panel to the reflecting member.

18 Claims, 9 Drawing Sheets

(56) References Cited

U.S. PATENT DOCUMENTS

2015/0153610 A1* 6/2015 Watanabe ......... G02F 1/133526
349/60

* cited by examiner

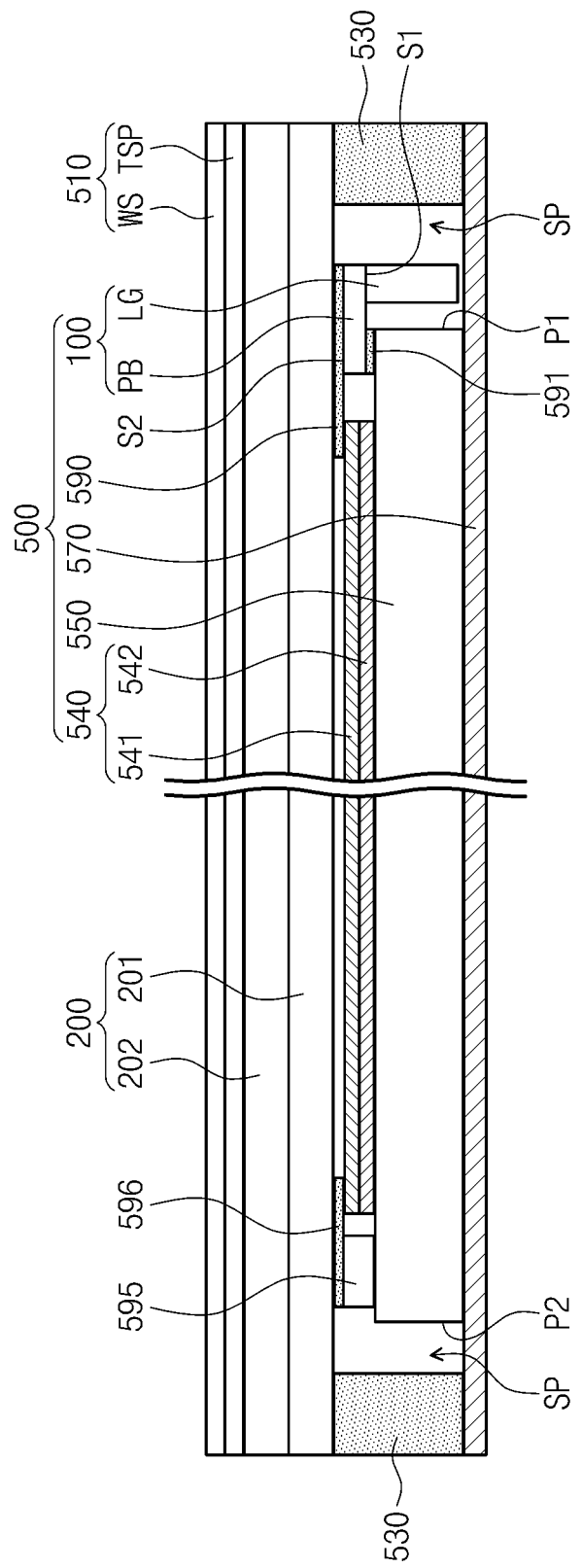

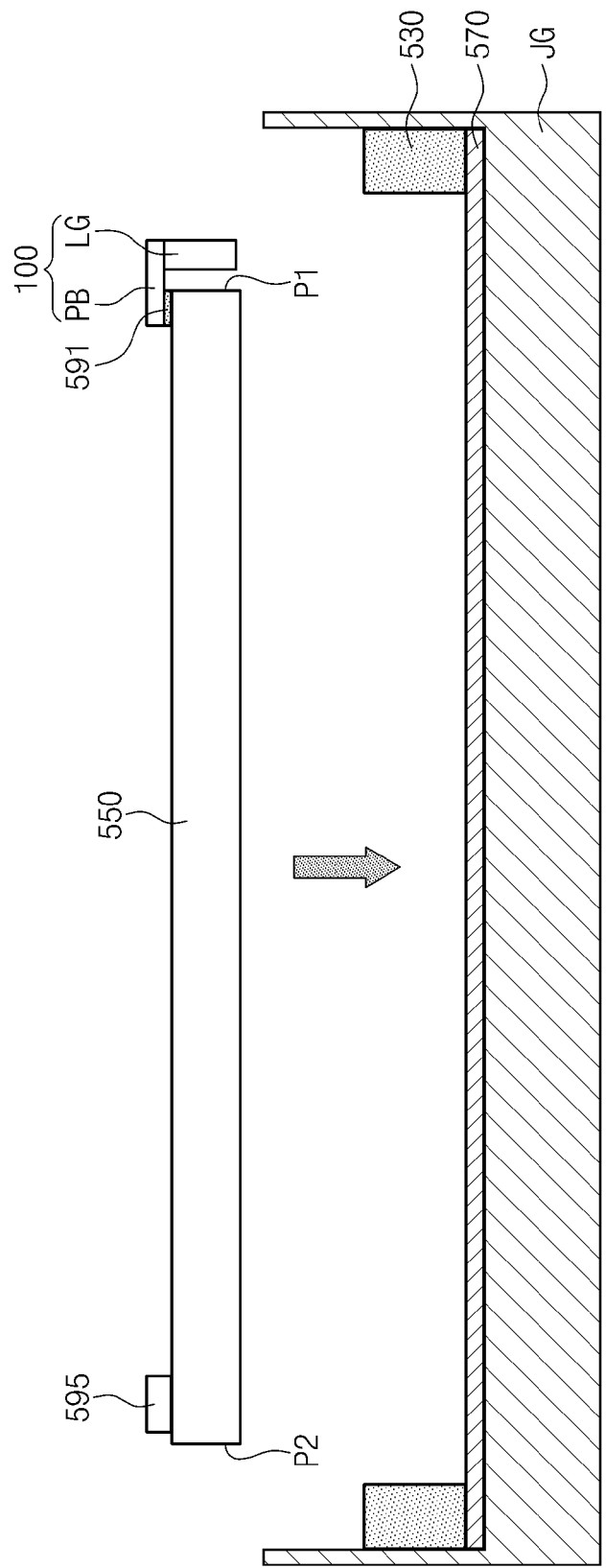

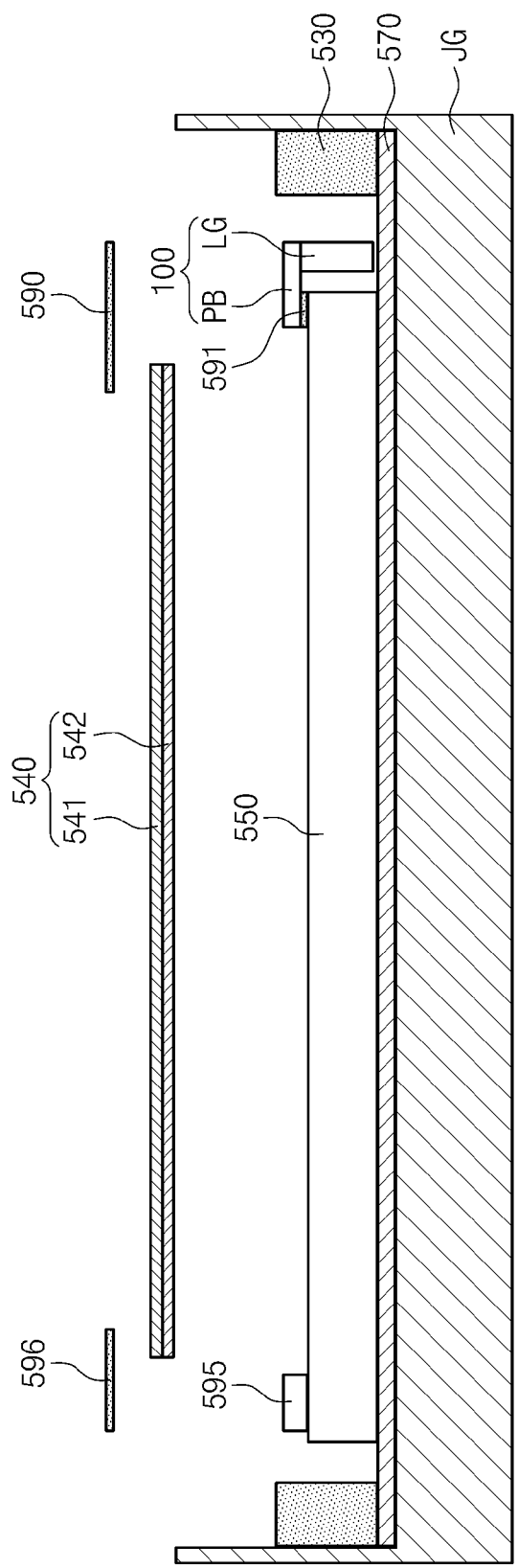

DISPLAY APPARATUS

This application claims priority to Korean Patent Application No. 10-2014-0013212, filed on Feb. 5, 2014, and all the benefits accruing therefrom under 35 U.S.C. §119, the entire contents of which are hereby incorporated by reference.

BACKGROUND (a) Field

The invention relates to a display apparatus, and more particularly, to a display apparatus including a backlight assembly.

(b) Description of the Related Art

Methods for reducing a volume and a weight of a display apparatus applied to a mobile information processing device such as a tablet personal computer and a laptop personal computer have been researched.

SUMMARY

Particularly, when a display apparatus includes a backlight assembly, methods of omitting some of components of the backlight assembly to reduce volumes and weights of the backlight assembly and the display apparatus, respectively, have been researched.

One or more exemplary embodiment of the invention provides a display apparatus with volume and weight reduced.

An exemplary embodiment of the invention provides a display apparatus including a backlight assembly, a display panel and a first adhesive member. The backlight assembly outputs light, and the display panel receives the light and displays an image. Also, the first adhesive member is on an edge of the backlight assembly and fixes the backlight assembly to the display panel.

In an exemplary embodiment, the backlight assembly may include a light emitting unit, a light guide plate and a reflecting member, and the first adhesive member may intervene between the display panel and the reflecting member and may fix the display panel to the reflecting member.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 3 is a cross-sectional view illustrating an exemplary embodiment of a configuration, in which the backlight assembly, the display panel and a window assembly of the display apparatus shown in FIG. 2B are coupled with one another;

FIGS. 4A to 4D are views illustrating an exemplary embodiment of a method of assembling the backlight assembly, the display panel and the window assembly shown in FIG. 3 with one another.

DETAILED DESCRIPTION

Figure 1:
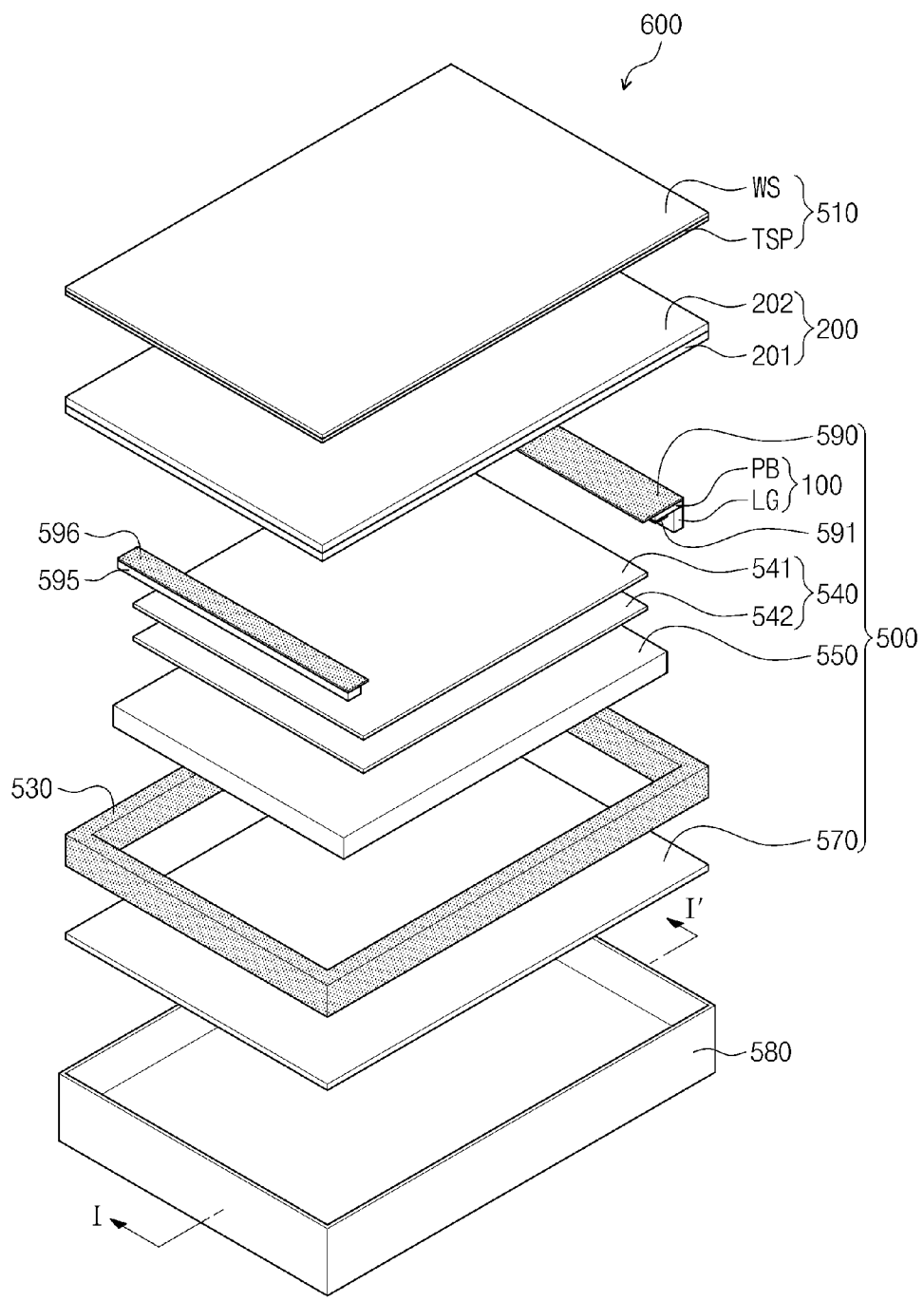
FIG. 1 is an exploded perspective view of an exemplary embodiment of a display device according to the invention.

Hereinafter, exemplary embodiments of the invention will be described in detail with reference to the attached drawings. Targets, features, and effects of the invention will be easily understood through the exemplary embodiments with reference to the drawings. Merely, the invention is not limited to the exemplary embodiments described below and may be modified and applied as various forms. The following exemplary embodiments are provided to allow technical thoughts of the invention to be clear, and additionally, to allow a person of ordinary skill in the art to fully understand the technical thoughts. Accordingly, the scope of the invention will not be understood as being limited by the following exemplary embodiments. On the other hand, throughout the following embodiments and drawings, like reference numerals designate like elements.

Also, the terms of "first" and "second" are not used to have limitative meanings but are used to distinguish one element from another. Also, when it is described that a part of a film, an area, or an element is "above" or "on" another part, not only the part may be directly above or on the other part but also another film, area, or element may intervene therebetween. As used herein, connected may refer to elements being physically and/or electrically connected to each other. As used herein, the term "and/or" includes any and all combinations of one or more of the associated listed items.

Spatially relative terms, such as "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "above" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Figure 2A:
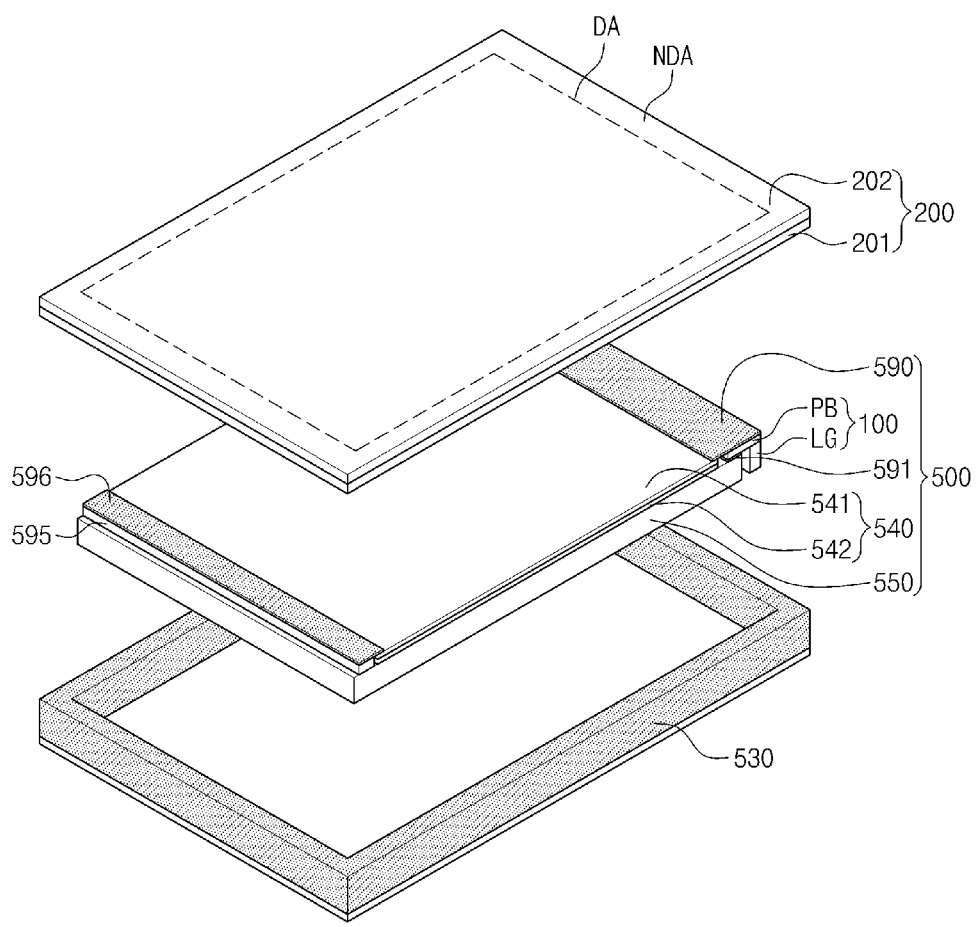
FIG. 2A is an exploded perspective view of an exemplary embodiment of a backlight assembly, a display panel and a first adhesive member shown in FIG. 1.
Figure 2B:
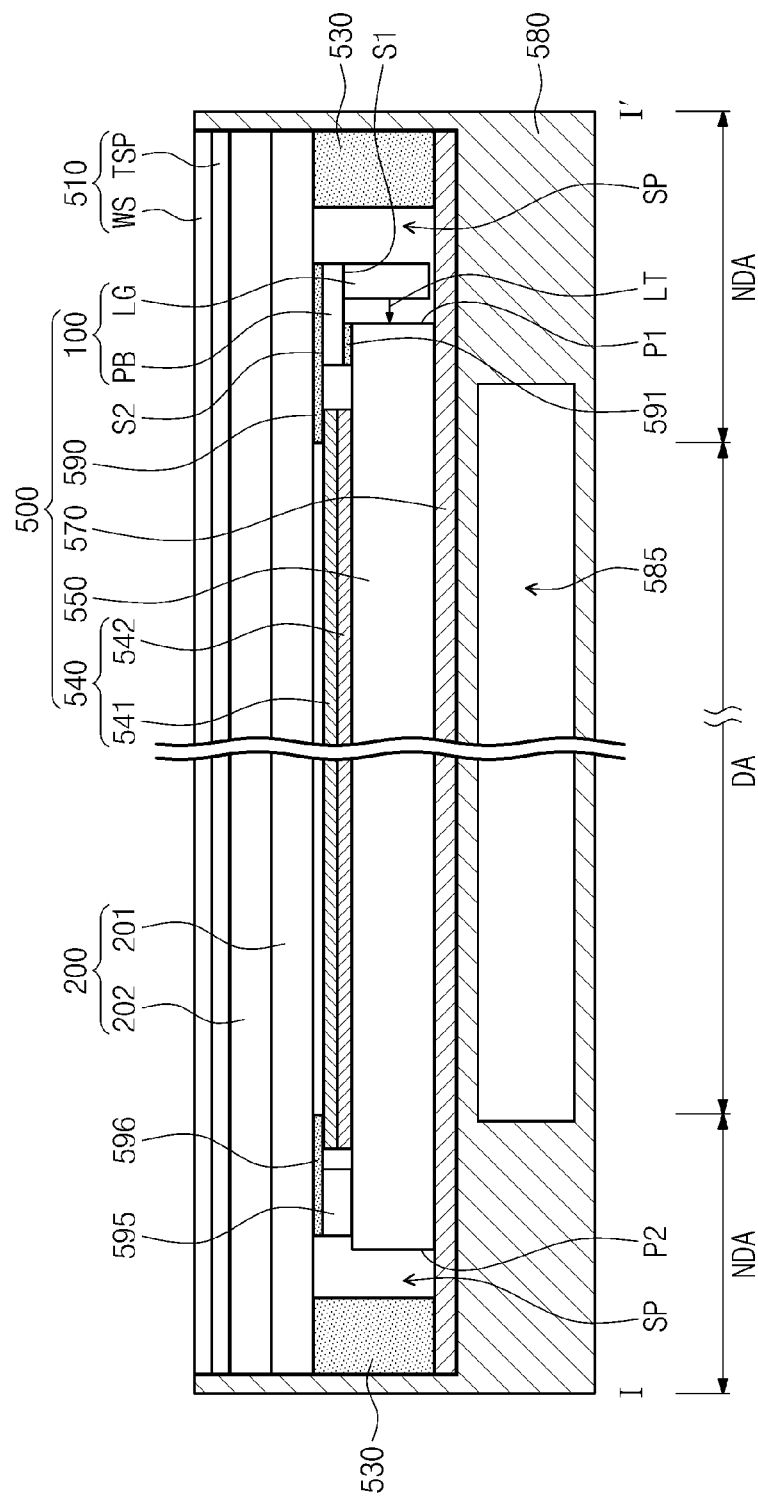
FIG. 2B is a cross-sectional view taken along line I-I' of FIG. 1.

FIG. 1 is an exploded perspective view of an exemplary embodiment of a display device 600 according to the invention, FIG. 2A is an exploded perspective view illustrating an exemplary embodiment of a backlight assembly 500, a display panel 200 and a first adhesive member 530 shown in FIG. 1, and FIG. 2B is a cross-sectional view taken along line I-I' of FIG. 1.

Referring to FIG. 1, the display apparatus 600 includes the display panel 200, the backlight assembly 500, a window assembly 510, a housing 580, and the first adhesive member 530. In one or more exemplary embodiment, the display apparatus 600 may be a mobile information processing device such as a tablet personal computer ("PC").

The display panel 200 includes a display area DA, and a non-display area NDA surrounding the display area DA. The display panel 200 receives light generated and outputted from the backlight assembly 500 and displays images through the display area DA. In an exemplary embodiment, the display panel 200 may be a liquid crystal display panel of which a size ranges from about 10 inches to about 14 inches in a plan view. The display panel 200 may include a display substrate 201, an opposite substrate 202, and a liquid crystal layer (not shown) between the display substrate 201 and the opposite substrate 202.

The display substrate 201 may include a plurality of pixel electrodes disposed in a plurality of pixel areas. The opposite substrate 202 may include a common electrode (not shown) opposite to the plurality of pixel electrodes. The invention is not limited to a configuration of the above-described display panel 200. In another exemplary embodiment, for example, the opposite substrate 202 does not include the common electrode. Instead, the display substrate 201 may include the common electrode. Where the common electrode and the plurality of pixel electrodes are both in the display substrate 201, the common electrode may be disposed separate from the plurality of pixel electrodes.

The backlight assembly 500 includes a light emitting unit 100, a reflecting member 570, a light guide plate 550 and optical sheets 540.

The light emitting unit 100 generates output light LT. The output light LT is incident upon the light guide plate 550. In an exemplary embodiment, the light emitting unit 100 may include a printed circuit board ("PCB") PB and a plurality of light emitting diode ("LED") packages LG. The plurality of LED packages LG are mounted on the PCB PB and generate and emit the output light LT.

In an exemplary embodiment, the light emitting unit 100 is disposed adjacent to a first side portion P1 of the light guide plate 550. In more detail, the PCB PB may be elongated to extend along the first side portion P1 of the light guide plate 550 and the plurality of LED packages LG may be arranged separate from one another in a direction in which the PCB PB extends.

As describe above, in an exemplary embodiment, the LED packages LG are arranged along the first side portion P1 of the light guide plate 550 but the invention is not limited to the above-described location and number of the LED packages LG. In another exemplary embodiment, for example, another (second) light emitting unit (not shown) in addition to the (first) light emitting unit 100 may be further disposed to be opposite to a second side portion P2 of the light guide plate 550 and/or a plurality of other LED packages may be arranged along the second side portion P2 of the light guide plate 550. In still another exemplary embodiment, one LED package may be disposed adjacently to a corner of the light guide plate 550. Herein, the one LED package may be opposite to a plane cut with the corner of the light guide plate 550, such as being opposite to a chamfered corner of the light guide plate 550.

In an exemplary embodiment, the light emitting unit 100 may be fixed to a rear side of the display panel 200. In more detail, when defining a first surface S1 of the PCB PB and a second surface S2 opposite to the first surface S1, the LED packages LG may be mounted on the first surface S1 and the second surface S2 may be fixed to the rear side of the display panel 200. In an exemplary embodiment, to fix the light emitting unit 100 to the rear side of the display panel 200, a second adhesive member 590 may be between the PCB PB and the display panel 200. In an exemplary embodiment, the second adhesive member 590 may be a double-sided tape but is not limited thereto or thereby.

Also, an edge portion of the PCB PB is between the first side portion P1 of the light guide plate 550 and the display panel 200. An adhesive part 591 such as a double-sided tape is between the first side portion P1 of the light guide plate 550 and the PCB PB, thereby allowing the light emitting unit 100 to be more stably fixed to the display panel 200 in cooperation with the second adhesive member 590. Also, a first end of the light guide plate 550 and the optical sheets 540, adjacent to the light emitting unit 100, may be fixed to the rear side of the display panel 200 via the second adhesive member 590 and the adhesive part 591.

In an exemplary embodiment, the backlight assembly 500 may further include a buffer member 595 and a third adhesive member 596 provided on the second side portion P2 of the light guide plate 550. A cross-sectional thickness of the buffer member 595 may be the same as a total sum of a cross-sectional thickness of the PCB PB and a cross-sectional thickness of the adhesive part 591, thereby reducing or effectively preventing the display panel 200 from slanting in direction from the first side portion P1 toward the second side portion P2. In an exemplary embodiment, the buffer member 595 may be a double-sided tape or a single-sided tape, but the invention is not limited thereto or thereby.

The third adhesive member 596 is provided on the second side portion P2 of the light guide plate 550, and a second end of the light guide plate 550 and the optical sheets 540, opposite to the first end may be fixed to the rear side of the display panel 200 via the buffer member 595 and the third adhesive member 595. In an exemplary embodiment, the third adhesive member 596 may be a double-sided tape but the invention is not limited thereto or thereby.

The reflecting member 570 is disposed on a bottom of the light guide plate 550 and is opposite to the display panel 200 with the light guide plate 550 intervening therebetween. The reflecting member 570 includes a material configured to reflect light, such as polyethylene terephthalate ("PET") and aluminum, thereby having light reflection properties. In an exemplary embodiment, the reflecting member 570 may have the shape of a sheet having a cross-sectional thickness of from about several micrometers to about several hundred micrometers.

The reflecting member 570 reflects light not incident upon the light guide plate 550 among light generated from the LED packages LG toward the light guide plate 550. Accordingly, an amount of the light generated from the LED packages LG and incident upon the light guide plate 550 may be increased by the reflecting member 570.

The optical sheets 540 are disposed between the display panel 200 and the light guide plate 550. In an exemplary embodiment, the optical sheets 540 may include a diffusion sheet 541 and a prism sheet 542. The diffusion sheet 541 is configured to diffuse light outputted from the light guide plate 550. The prism sheet 542 is configured to improve frontal brightness of the display panel 200 by collecting the light diffused by the diffusion sheet 541.

The window assembly 510 covers the display panel 200. In an exemplary embodiment, the window assembly 510 may include a window substrate WS and a touch screen panel TSP. The window substrate WS is disposed on an outermost side of the display panel 200 and is exposed outwards such as at a viewing side of the display apparatus 600. The window substrate WS may include a transmitting portion corresponding to the display area DA and through which light is transmitted, and a shielding portion corresponding to the non-display area NDA and through which light is not transmitted.

The touch screen panel TSP is coupled with the window substrate WS and is configured to sense a location of a touch occurring on the window substrate WS. In an exemplary embodiment, the touch screen panel TSP may operate as an electrostatic capacitive type. However, the type of the touch screen panel TSP is not limited thereto. In other exemplary embodiments, the touch screen panel TSP may operate as a resistive film type, an ultrasonic type and/or an infrared type.

Also, not shown in the drawings, an adhesive film having light transmittance such as an optically clear adhesive ("OCA") film may intervene between the touch screen panel TSP and the display panel 200. The window assembly 510 may be fixed to the display panel 200 via the adhesive film.

The housing 580 is configured to receive the display panel 200 and the backlight assembly 500. In an exemplary embodiment, the housing 580 may include plastic material and spaces may be defined therein to receive a plurality of components configured to drive the display apparatus 600. In an exemplary embodiment, for example, a battery containing space 585 for receiving a battery which supplies power to the display panel 200 may be defined in the housing 580.

The first adhesive member 530 adheres to an edge of the backlight assembly 500 and fixes the backlight assembly 500 to the display panel 200. In an exemplary embodiment, the first adhesive member 530 may be a double-sided tape but the invention is not limited thereto. A structure and a function of the first adhesive member 530 will be described in detail as follows.

Referring to FIG. 1 and FIG. 2A, the first adhesive member 530 may have a closed-loop shape in the plan view, and is attached to an edge of the reflecting member 570. A location of the first adhesive member 530 may correspond to the non-display area NDA of the display panel 200. Accordingly, the first adhesive member 530 allows the edge of the reflecting member 570 to adhere to the non-display area NDA of the display panel 200, thereby allowing the backlight assembly 500 having the reflecting member 570 as a component thereof to be fixed to the display panel 200 via the first adhesive member 530. Also, an optical distance between the display panel 200 and the light guide plate 550 may be easily controlled by a cross-sectional thickness of the first adhesive member 530.

According to one or more exemplary embodiment described above, the first adhesive member 530 may not only fix the backlight assembly 500 to the display panel 200 but also may control the optical distance between the display panel 200 and the light guide plate 550. Accordingly, in one or more exemplary embodiment according to the invention, a related art mold frame which would fix the display panel 200 to a top of the light guide plate 550 by supporting edges of the display panel 200, may be omitted from the backlight assembly 200. The omitted related art mold frame may be replaced by the first adhesive member 530 of one or more exemplary embodiment according to the invention.

In the related art, the mold frame may be provided in the backlight assembly to increase the strength of a display apparatus in addition to fixing the display panel to the top of the backlight assembly light guide plate by supporting edges of the display panel. Among display apparatuses, a backlight assembly may be coupled with a display panel having a size of about 14 inches or less. Accordingly, in one or more exemplary embodiment according to the invention, although the related art mold frame is omitted from the backlight assembly 500, the strength of the display apparatus 600 may be fully provided by the display panel 200 and the light guide plate 550 having solid properties, such as being substantially rigid or non-deforming.

Also, in one or more exemplary embodiment according to the invention, a related art bottom sash including a metallic material which would receive the reflecting member 570, the light guide plate 550, the optical sheets 540 and the light emitting unit 100, and simultaneously, improve strength properties of the backlight assembly 500 may be omitted from the backlight assembly 500. In one or more exemplary embodiment according to the invention, although the related bottom sash is omitted from the backlight assembly 500, as described above, the strength of the display apparatus 600 may be fully provided by fixing of the display panel 200 and the light guide plate 550 to each other. The strength of the display apparatus 600 fully provided by fixing of the display panel 200 and the light guide plate 550 to each other will be described in detail with reference Table 1 as follows.

TABLE 1

| Test module | | Distortion deformation amount | Distortion deformation rate | |
|---|---|---|---|---|
| Television (about 40 inches) | Basic module | 30.3 mm | — | Comparative example |
| | Display panel omitted (first module) | 39.7 mm | 23.7% | Comparative example |
| | Light guide plate omitted (second module) | 33.1 mm | 8.4% | Comparative example |
| | Bottom sash omitted (third module) | 69.5 mm | 56.4% | Comparative example |
| | Mold frame omitted (fourth module) | 31.5 mm | 3.7% | Comparative example |
| Tablet PC (about 10 inches) | Basic module | 30.3 mm | — | Comparative example |
| | Display panel omitted (fifth module) | 95.6 mm | 68.3% | Comparative example |
| | Light guide plate omitted (sixth module) | 34.6 mm | 12.4% | Comparative example |
| | Bottom sash omitted (seventh module) | 36.7 mm | 17.5% | Exemplary Embodiment |
| | Mold frame omitted (eighth module) | 31.2 mm | 2.7% | Exemplary Embodiment |

Table 1 shows distortion deformation amounts in millimeters (mm) and distortion deformation rate in percent (%) of configurations of Exemplary Embodiments according to the invention and Comparative examples of a television and a tablet PC. As described above, in one or more exemplary embodiment of the invention, since the display apparatus 600 has a size corresponding to a tablet PC having a size of about 14 inches or less, data corresponding to a television having a size of about 40 inches relate to the Comparative examples and some of data corresponding to a tablet PC having a size of about 14 inches or less relate to the Exemplary Embodiments in Table 1.

Referring to Table 1 for the distortion deformation amount and the distortion deformation rate of the television, when a basic module of the television is defined as a module including all of a display panel, a light guide plate, a bottom sash and a mold frame, an external force having a certain size for distorting the basic module of the television by about 30.3 mm may be defined.

When an external force having the same size as the external force is applied to a first module omitting the display panel from the television, a distortion deformation amount of the first module is about 39.7 mm and a distortion deformation rate of the first module to the basic module is about 23.7%. Also, identically to measuring the distortion deformation amount and the distortion deformation rate of the first module, a second module omitting the light guide plate from the television, a third module omitting the bottom sash from the television, and a fourth module omitting the mold frame from the television show distortion deformation rates to the basic module of about 8.4%, 56.4%, and 3.7%, respectively.

Referring to Table 1 for the distortion deformation rates measured from the total five modules of the television, it may be observed that about 80.1% of the strength of the television may be provided by the display panel and the bottom sash among components of the television.

Next, in Table 1, when a basic module of the tablet PC is defined as a module including all of a display panel, a light guide plate, a bottom sash and a mold frame, an external force having a certain size for distorting the basic module of the tablet PC by 30.3 mm may be defined.

A fifth module omitting the display panel from the tablet PC, a sixth module omitting the light guide plate from the tablet PC, a seventh module omitting the bottom sash from the tablet PC, and an eighth module omitting the mold frame from the tablet PC show distortion deformation rates to the basic module of 68.3%, 12.4%, 17.5%, and 2.7%, respectively.

Referring to Table 1 for the distortion deformation rates measured from the total five modules of the tablet PC, the strength of the tablet PC provided by the bottom sash is about 17.5%. However, as a test module is changed from the television into the tablet, a degree to which the bottom sash contributes to the strength of the test module is reduced by about 38.9% from about 56.4% to about 17.5%. This is, as a size of the test module decreases, the degree to which the bottom sash contributes to the strength of the test module also decreases. Similarly, as the size of the test module decreases, a degree to which the mold frame contributes to the strength of the test module also decreases.

Differently from the bottom sash and the mold frame, as the size of the test module decreases, respective degrees to which the display panel and the light guide plate contribute to the strength of the test module increase. Accordingly, in one or more exemplary embodiment according to the invention, although the bottom sash and the mold frame, which area components of a backlight assembly, are omitted, about 80.7% of the strength of the display apparatus 600 may be maintained by the display panel 200 and the light guide plate 550.

Hereinafter, referring to FIG. 3, a configuration in which the flatness of the reflecting member 570 is maintained before the backlight assembly 500 is received in the housing 580 will be described as follows.

FIG. 3 is a view illustrating a configuration, in which the backlight assembly 500, the display panel 200 and the window assembly 510 of the display apparatus 600 shown in FIG. 2B are coupled with one another.

That is, with reference to a method of manufacturing a display apparatus, FIG. 3 illustrates the backlight assembly 500, the display panel 200 and the window assembly 510 before being coupled with the housing 580. With reference to FIG. 3, the components are labeled with the same reference numerals described above and repetitive descriptions thereof will be omitted.

Referring to FIG. 3, before the backlight assembly 500, the display panel 200 and the window assembly 510 are coupled with the housing 580, the reflecting member 570 of the backlight assembly 500 is exposed outwards as a lowermost member of the backlight assembly 500.

Before the backlight assembly 500, the display panel 200 and the window assembly 510 are coupled with the housing 580, it may be advantageous to maintain a shape of the backlight assembly 500. Particularly, in an exemplary embodiment, since the reflecting member 570 exposed outwards has a sheet shape having a cross-sectional thickness from about several micrometers to about several hundred micrometers, it may be advantageous to maintain the flatness of the reflecting member 570 exposed outwards.

In one or more exemplary embodiment, to maintain flatness of the reflecting member 570 of the backlight assembly 500 exposed outwards, the reflecting member 570, and the first adhesive member 530 adhering to the reflecting member 570, may have a configuration as follows. As shown in FIG. 2A, the first adhesive member 530 has a closed-loop shape, is between the display panel 200 and the reflecting member 570, and adheres to the display panel 200 and the reflecting member 570 to each other. Accordingly, the first adhesive member 530 blocks a space SP defined between the display panel 200 and the reflecting member 570 from the outside the backlight assembly 500, thereby sealing the space SP. The first adhesive member 530 may be considered as occupying a portion of the space SP defined between the display panel 200 and the reflecting member 570 while a remaining portion of the space SP is blocked from the outside the backlight assembly 500, thereby sealing the space SP As the space SP is sealed by the first adhesive member 530, such as in cooperation with the display panel 200 and the reflecting member 570, the intensity of air pressure in the space SP increases, thereby reducing a deterioration in the flatness of the reflecting member 570 caused by air pressure applied to the reflecting member 570 from the outside. That is, the increased intensity air pressure in space essentially counters the air pressure applied to the reflecting member 570 from the outside. Accordingly, since the flatness of the reflecting member 570 is provided and maintained with respect to the display panel, by the first adhesive member 530, assembly of the backlight assembly 500 with the housing 580 is simplified.

FIGS. 4A to 4D are views illustrating an exemplary embodiment of a method of assembling the backlight assembly 500, the display panel 200 and the window assembly 510 shown in FIG. 3 with one another. With reference to FIGS. 4A to 4D, the components are labeled with the same reference numerals described above and repetitive descriptions thereof will be omitted.

Figure 4A:
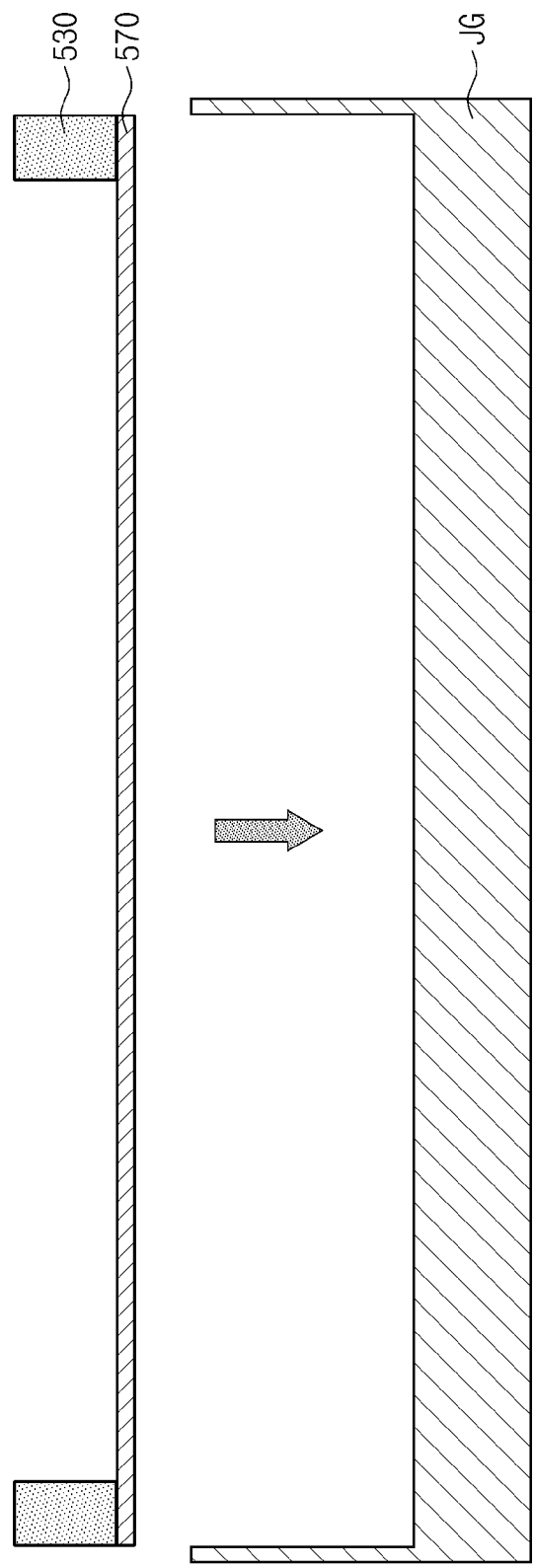

Referring to FIG. 4A, a jig JG is prepared. The jig JG may be formed of a solid material such as plastic or metal. A receiving space is defined in the jig JG.

After that, the reflecting member 570 is provided on a bottom surface of at the receiving space of the jig JG and the first adhesive member 530 is adhered to the reflecting member 570. Although not shown in FIG. 4A, as shown in FIG. 2A, the first adhesive member 530 may be provided on an edge of the reflecting member 570 while having a closed-loop shape.

Referring to FIG. 4B, the light guide plate 550 is provided on the reflecting member 570 to be surrounded by the first adhesive member 530 in the plan view. The adhesive part 591 such at a double-sided tape is provided on the first side portion P1 of the light guide plate 550 and the PCB PB of the light emitting unit 100 is fixed to the first side portion P1 via the adhesive part 591.

Also, the buffer member 595 is provided on the second side portion P2 of the light guide plate 550, opposite to the first side portion P1. In an exemplary embodiment, a cross-sectional thickness of the buffer member 595 may be the same as a total sum of a cross-sectional thickness of the PCB PB and a cross-sectional thickness of the adhesive part 591, thereby reducing or effectively preventing slanting of the display panel 200 in a direction from the first side portion P1 toward the second side portion P2.

Referring to FIG. 4C, the optical sheets 540 including the diffusion sheet 541 and the prism sheet 542 are provided on the light guide plate 550, the second adhesive member 590 is provided to the first side portion P1 of the light guide plate 550 and the third adhesive member 596 is provided to the second side portion P2 of the light guide plate 550. As a result thereof, a first end of the optical sheets 540 is fixed to the PCB PB by the second adhesive member 590 and a second end opposite to the first end of the optical sheets 540 is fixed to the buffer member 595 by the third adhesive member 596.

In an exemplary embodiment, the second adhesive member 590 and the third adhesive member 596 may be double-sided tapes, respectively, but the invention is not limited thereto. Accordingly, adhesive sides of the respective second and third adhesive members 590 and 596 may be exposed outwards and may be used to fix the display panel 200.

Figure 4D:
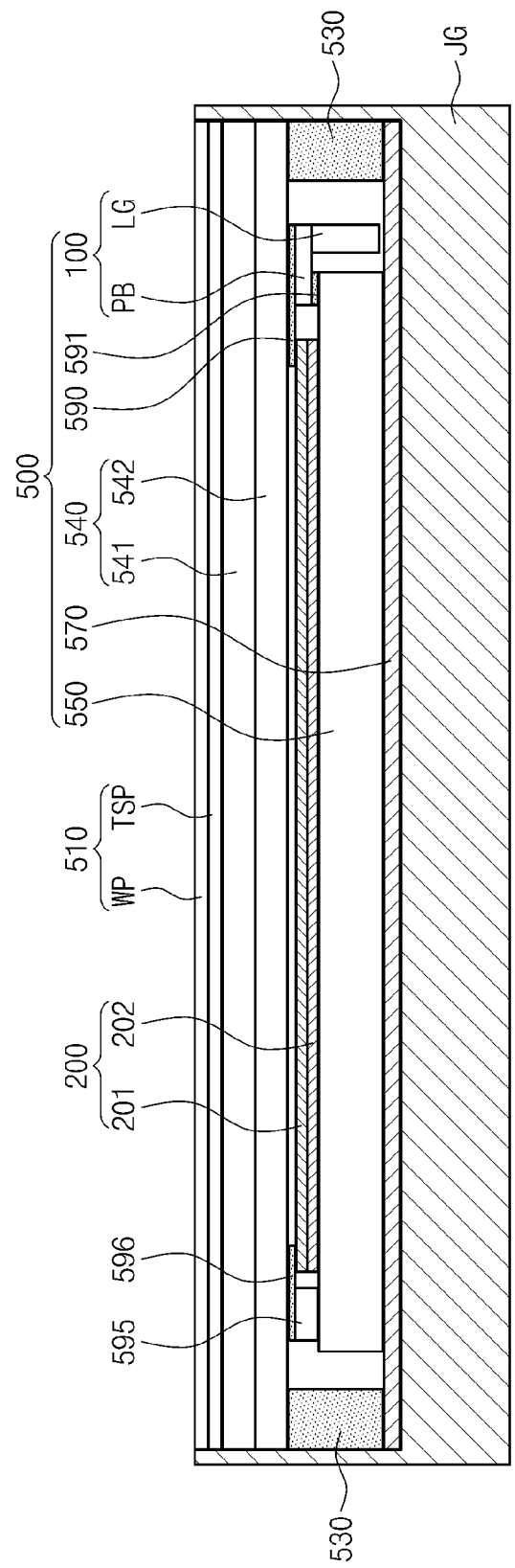

Referring to FIG. 4D, the display panel 200 and the window assembly 510 are sequentially provided on the optical sheets 540 of the backlight assembly 500. A first end of the display panel 200 is coupled to the adhesive side of the second adhesive member 590 exposed outwards, and a second end of the display panel 200 opposite to the first end is coupled to the adhesive side of the third adhesive member 596 exposed outwards. Also, although not shown in FIG. 4D, an adhesive film having optical transmittance such as an OCA film may intervene between the display panel 200 and the window assembly 510 to allow the window assembly 510 to be fixed to the display panel 200.

The backlight assembly 500, the display panel 200 and the window assembly 510, which are coupled with one another, are separated from the jig JG, thereby completing assembly of the backlight assembly 500, the display panel 200 and the window assembly 510.

Figure 5:
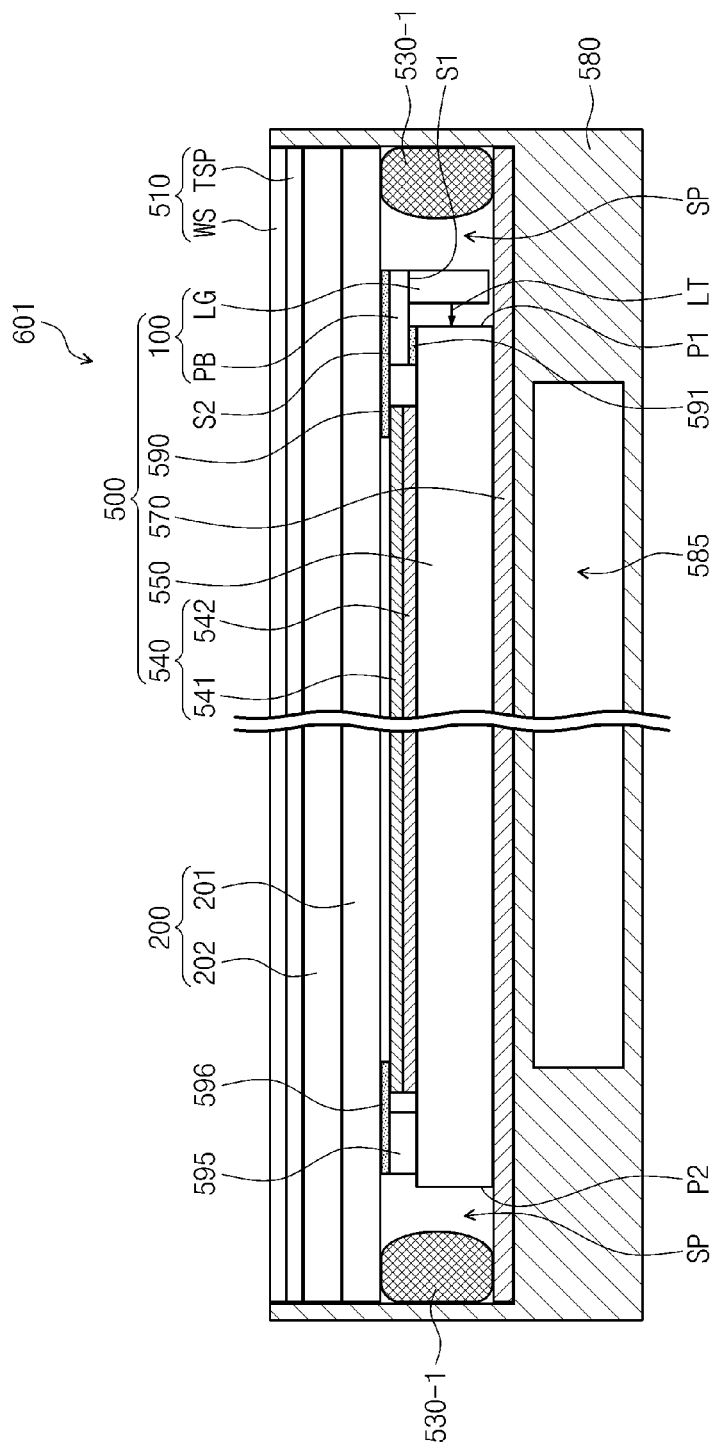
FIG. 5 is a cross-sectional view of another exemplary embodiment of a display apparatus according to the invention.

FIG. 5 is a cross-sectional view of another exemplary embodiment of a display apparatus 601 according to the invention. With reference to FIG. 5, the components are labeled with the same reference numerals described above and repetitive descriptions thereof will be omitted.

Referring to FIG. 5, the display apparatus 601 a first adhesive member 530-1 includes adhesive resin instead of the first adhesive member 530 that is a double-sided tape. In an exemplary embodiment, the adhesive resin 530-1 may be silicone resin, but the invention is not limited thereto. In an exemplary embodiment of manufacturing the display apparatus 601, the adhesive resin to be the first adhesive member 530-1 is applied along the edge of the reflecting member 570 and is cured to form the first adhesive member 530-1 which is configured to fix the reflecting member 570 to the display panel 200.

Also, similar to the first adhesive member 530, the first adhesive member 530-1 including the adhesive resin may have a closed-loop shape disposed between the reflecting member 570 and the display panel 200. Accordingly, the adhesive resin first adhesive member 530-1 blocks the space SP defined between the display panel 200 and the reflecting member 570 from the outside of the backlight assembly 500 to seal the space SP. As a result thereof, the intensity of air pressure in the space SP is increased by the adhesive resin first adhesive member 530-1, thereby reducing a deterioration in the flatness of the reflecting member 570 caused by external air pressure to the backlight assembly 500.

According to one or more exemplary embodiment according to the invention, although a related art bottom sash and mold frame, which are components of a backlight assembly of a related art display apparatus, are omitted, the strength of a display apparatus of the invention may be fully provided by a display panel and a light guide plate.

Accordingly, since the related art bottom sash and mold frame are omitted from one or more exemplary embodiment of the backlight assembly according to the invention, a volume and a weight of the backlight assembly are reduced and manufacturing costs of the backlight assembly are reduced.

The above-disclosed subject matter is to be considered illustrative and not restrictive, and the appended claims are intended to cover all such modifications, enhancements, and other exemplary embodiments, which fall within the true spirit and scope of the invention. Thus, to the maximum extent allowed by law, the scope of the invention is to be determined by the broadest permissible interpretation of the following claims and their equivalents, and shall not be restricted or limited by the foregoing detailed description.

What is claimed is:

1. A display apparatus comprising:
a display panel configured to receive light and display an image;
a backlight assembly which generates and outputs the light, the backlight assembly comprising:
a light emitting unit which generates the light;
a light guide plate which guides the light generated from the light emitting unit, toward the display panel, and
a reflecting member opposite to the display panel with respect to the light guide plate; and
a first adhesive member which is on an edge of the backlight assembly and fixes the backlight assembly to the display panel,
wherein
the display panel and the reflecting member each extend further than edges of the light guide plate to respectively define an extended portion thereof,
the first adhesive member includes a first surface and a second surface which is parallel to the first surface, all of the first surface overlaps the display panel in a plan view, and all of the second surface overlaps the reflecting member in the plan view, and
the first surface directly contacts the extended portion of the display panel and the second surface directly contacts the extended portion of the reflecting member, to fix the backlight assembly to the display panel.

2. The display apparatus of claim 1, wherein the first adhesive member is spaced apart from the edges of the light guide plate from which the display panel and the reflecting member further extend.

3. The display apparatus of claim 2, wherein the display panel comprises a display area in which the image is displayed, and a non-display area surrounding the display area and in which the image is not displayed, and
wherein the first adhesive member fixes the extended portion of the reflecting member to the non-display area of the display panel.

4. The display apparatus of claim 3, wherein the first adhesive member has a closed-loop shape in the plan view.

5. The display apparatus of claim 4, wherein
the reflecting member has a sheet shape,
the display panel, the reflecting member and the first adhesive member define a space, and
the first adhesive member seals the space.

6. The display apparatus of claim 2, wherein the first adhesive member is a double-sided tape.

7. The display apparatus of claim 2, wherein the first adhesive member comprises adhesive resin.

8. The display apparatus of claim 2, wherein the light emitting unit comprises:
a printed circuit board; and
a light emitting diode package which generates and emits the light, is mounted on the printed circuit board, and faces a side of the light guide plate.

9. The display apparatus of claim 8, further comprising a second adhesive member which fixes the light emitting unit to the display panel,
wherein
the light emitting diode package is mounted on a first side of the printed circuit board, and
the second adhesive member is on a second side opposite to the first side of the printed circuit board, and fixes the printed circuit board to the extended portion of the display panel.

10. The display apparatus of claim 9, wherein the printed circuit board is between a first side portion of the light guide plate and the extended portion of the display panel.

11. The display apparatus of claim 10, further comprising a buffer member between a second side portion of the light guide plate opposite to the first side portion, and the display panel at the second side portion of the light guide plate.

12. The display apparatus of claim 11, wherein the buffer member comprises an adhesive tape.

13. The display apparatus of claim 1, further comprising:
a window assembly which covers the display panel; and
a housing in which the display panel and the backlight assembly are received.

14. The display apparatus of claim 13, wherein
the display panel comprises a display area in which the image is displayed, and a non-display area surrounding the display area and in which the image is not displayed, and
the window assembly comprises:
a window substrate comprising a transmitting portion corresponding to the display area of the display panel; and
a touch screen panel coupled with the window substrate and configured to sense a location of a touch occurring on the window substrate.

15. The display apparatus of claim 13, wherein a battery receiving space is defined in the housing, in which the battery is received.

16. The display apparatus of claim 1, wherein a size of the display panel is about 14 inches or less.

17. A display apparatus comprising:
a display panel configured to receive a light and display an image; a light emitting unit which generates the light;
a light guide plate which guides the light generated from the light emitting unit, toward the display panel,
a reflecting member opposite to the display panel with respect to the light guide plate; and
a first adhesive member disposed between the display panel and the reflecting member, the first adhesive member spaced apart from edges of the light guide plate in a plan view, and
wherein
the display panel and the reflecting member each extend further than the edges of the light guide plate to respectively define an extended portion thereof, the first adhesive member is a double-sided tape,
an upper surface of the first adhesive member directly contacts the extended portion of the display panel, and
a lower surface of the first adhesive member parallel to the upper surface of the first adhesive member directly contacts the extended portion of the reflecting member to fix the reflecting member to the display panel.

18. A display apparatus comprising:
a display panel configured to receive a light and display an image; a light emitting unit which generates the light;

a light guide plate which guides the light generated from the light emitting unit, toward the display panel,
a reflecting member opposite to the display panel with respect to the light guide plate; and
a first adhesive member disposed between the display panel and the reflecting member,
the first adhesive member spaced apart from edges of the light guide plate in a plan view, and wherein
the display panel and the reflecting member each extend further than the edges of the light guide plate to respectively define an extended portion thereof,
the first adhesive member comprises an adhesive resin,
an upper surface of the first adhesive member directly contacts the extended portion of the display panel, and
a lower surface of the first adhesive member parallel to the upper surface of the first adhesive member directly contacts the extended portion of the reflecting member to fix the reflecting member to the display panel, and all of the upper surface is overlapped with the display panel in a plan view, and all of the lower surface is overlapped with the reflecting member in the plan view.

* * * * *